US011432143B2

(12) United States Patent
Norton, Jr. et al.

(10) Patent No.: US 11,432,143 B2
(45) Date of Patent: Aug. 30, 2022

(54) AUTHENTICATION BASED ON NETWORK CONNECTION HISTORY

(71) Applicant: Lenovo (Singapore) Pte. Ltd., Singapore (SG)

(72) Inventors: Robert James Norton, Jr., Raleigh, NC (US); Justin Michael Ringuette, Morrisville, NC (US); Sandy Scott Collins, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 317 days.

(21) Appl. No.: 16/547,310

(22) Filed: Aug. 21, 2019

(65) Prior Publication Data

US 2021/0058782 A1 Feb. 25, 2021

(51) Int. Cl.

*G06F 7/04* (2006.01)
*H04W 12/06* (2021.01)
*H04L 9/40* (2022.01)

(52) U.S. Cl.

CPC ......... *H04W 12/06* (2013.01); *H04L 63/0876* (2013.01); *H04L 63/102* (2013.01)

(58) Field of Classification Search

CPC .......... G06F 21/44; G06F 21/60; G06F 21/62; G06F 21/31; G06F 21/316; G06F 21/335; G06F 21/35; G06F 21/552; G06F 2221/2151; G06F 2221/2141; H04L 9/0863; H04L 63/10; H04L 63/101; H04L 63/0876; H04L 63/102; H04W 12/06; H04W 12/08; H04W 12/37; H04W 12/47

USPC .............................................................. 726/4

See application file for complete search history.

(56) References Cited

U.S. PATENT DOCUMENTS 9,301,137 B2 * 3/2016 Hoecker ............... H04W 12/06
9,351,163 B2 * 5/2016 Hunt ..................... H04W 12/08
9,591,675 B2 * 3/2017 Jung ..................... H04W 8/005
9,973,534 B2 * 5/2018 Mahaffey .............. H04L 63/105
10,044,714 B1 * 8/2018 Gan ........................ H04L 63/20
2009/0064299 A1 * 3/2009 Begorre .............. H04L 63/1466 726/7
2013/0100855 A1 * 4/2013 Jung ................... H04L 67/1044 370/254
2013/0183935 A1 * 7/2013 Holostov .............. H04W 36/22 455/411

(Continued)

OTHER PUBLICATIONS

Lee et al., A Novel and Scalable Communication History-Based Knapsack Authentication Framework for IEEE 802.11 Networks, IEEE, Sep. 30, 2015, pp. 44-52. (Year: 2015).*

(Continued)

*Primary Examiner* — Roderick Tolentino
*Assistant Examiner* — Jenise E Jackson
(74) *Attorney, Agent, or Firm* — John M. Rogitz; John L. Rogitz

(57) ABSTRACT

In one aspect, a first device includes at least one processor and storage accessible to the at least one processor. The storage includes instructions executable by the at least one processor to access a first network connection history for a second device different from the first device. The instructions are also executable to determine in a first instance whether to authenticate the second device based on the first network connection history and to authenticate the second device based on a determination to authenticate the second device.

20 Claims, 5 Drawing Sheets

FIG. 3

(56) References Cited

U.S. PATENT DOCUMENTS

| | | | | |
|---|---|---|---|---|
| 2014/0181943 | A1* | 6/2014 | Arashin | H04W 12/50<br>726/7 |
| 2016/0073440 | A1* | 3/2016 | Pallen | H04W 12/04<br>370/329 |
| 2016/0105412 | A1* | 4/2016 | Shen | H04W 76/10<br>726/4 |
| 2016/0119316 | A1* | 4/2016 | Liu | H04L 63/083<br>713/171 |

OTHER PUBLICATIONS

Yang et al, Protecting Endpoint Devices in IoT Supply Chain, IEEE, Nov. 6, 2015, pp. 351-356. (Year: 2015).*

* cited by examiner

AUTHENTICATION BASED ON NETWORK CONNECTION HISTORY

FIELD

The present application relates to technically inventive, non-routine solutions that are necessarily rooted in computer technology and that produce concrete technical improvements. In particular, the present application relates to authentication based on network connection history.

BACKGROUND

As computer security becomes increasingly important, attempts at defeating such security are also becoming increasingly sophisticated. As such, certain traditional modes of ensuring security used alone are becoming increasingly insufficient for actually ensuring security. For instance, requiring a password for logging in to various user accounts does not provide a sufficient level of security anymore due to hacks of data centers storing such passwords as well as those passwords being intercepted during transmission when a user attempts to login. There are currently no adequate solutions to the foregoing computer-related, technological problem and, as recognized herein, there is a need for more dynamic and additional ways to perform electronic authentication.

SUMMARY

Accordingly, in one aspect a device includes at least one processor and storage accessible to the at least one processor. The storage includes instructions executable by the at least one processor to access a first network connection history for a second device different from the first device. The instructions are also executable to determine in a first instance whether to authenticate the second device based on the first network connection history and to authenticate the second device based on a determination to authenticate the second device.

The first network connection history may be accessed by being received via a network interface of the first device from the second device, and may include a Wi-Fi network connection history. Additionally or alternatively, the first network connection history may include a non-Wi-Fi network connection history such as a Bluetooth connection history, an automatic teller machine (ATM) connection history, a near-field communication (NFC) connection history, a virtual private network (VPN) connection history, and/or a wired ethernet connection history.

In some examples, the instructions may also be executable to determine in the first instance whether to authenticate the second device based on data in the first network connection history matching data in a second network connection history for the second device that was previously stored at a storage location accessible to the first device. The matching may include network connections indicated in the first network connection history matching network connections indicated in the second network connection history by order of connection and/or by timing of connection.

Also in some examples, the instructions may be executable to store the first network connection history, and may then be executable to access a third network connection history for the second device and determine in a second instance whether to authenticate the second device based on data in the third network connection history matching data in the stored first network connection history. In these examples, the matched data in the stored first network connection history may not be indicated in the second network connection history. Furthermore, the instructions may then be executable determine in the second instance whether to authenticate the second device based on data in the third network connection history matching the data in the stored first network connection history and based on data in the third network connection history matching data in the second network connection history.

Additionally, in some examples the instructions may be executable to, prior to the first instance, receive the second network connection history in a third instance, where the third instance pertains to authentication and involves authentication through at least two other methods not involving use of any network connection history.

In another aspect, a method includes accessing, at a first device, a first network connection history for a second device different from the first device. The method also includes determining in a first instance whether to authenticate the second device based on the first network connection history and, responsive to determining to authenticate the second device based on the first network connection history, authenticating the second device and permitting access to at least one resource.

In certain examples, the resource may include one or more of access to a Wi-Fi network, access to an email account, access to another account accessible over the Internet, access to a bank account, and/or access to an account indicating medical records.

Also, in some examples, the method may include appending a second network connection history received prior to the first instance with data in the first network connection history responsive to determining to authenticate the second device based on the first network connection history.

In another aspect, a computer readable storage medium (CRSM) that is not a transitory signal includes instructions executable by at least one processor to access, via a first device, a first network connection history associated with a second device different from the first device. The instructions are also executable to determine in a first instance whether to authenticate the second device based on the first network connection history and to authenticate the second device responsive to a determination to authenticate the second device based on the first network connection history.

The details of present principles, both as to their structure and operation, can best be understood in reference to the accompanying drawings, in which like reference numerals refer to like parts, and in which:

DETAILED DESCRIPTION

Figure 1:
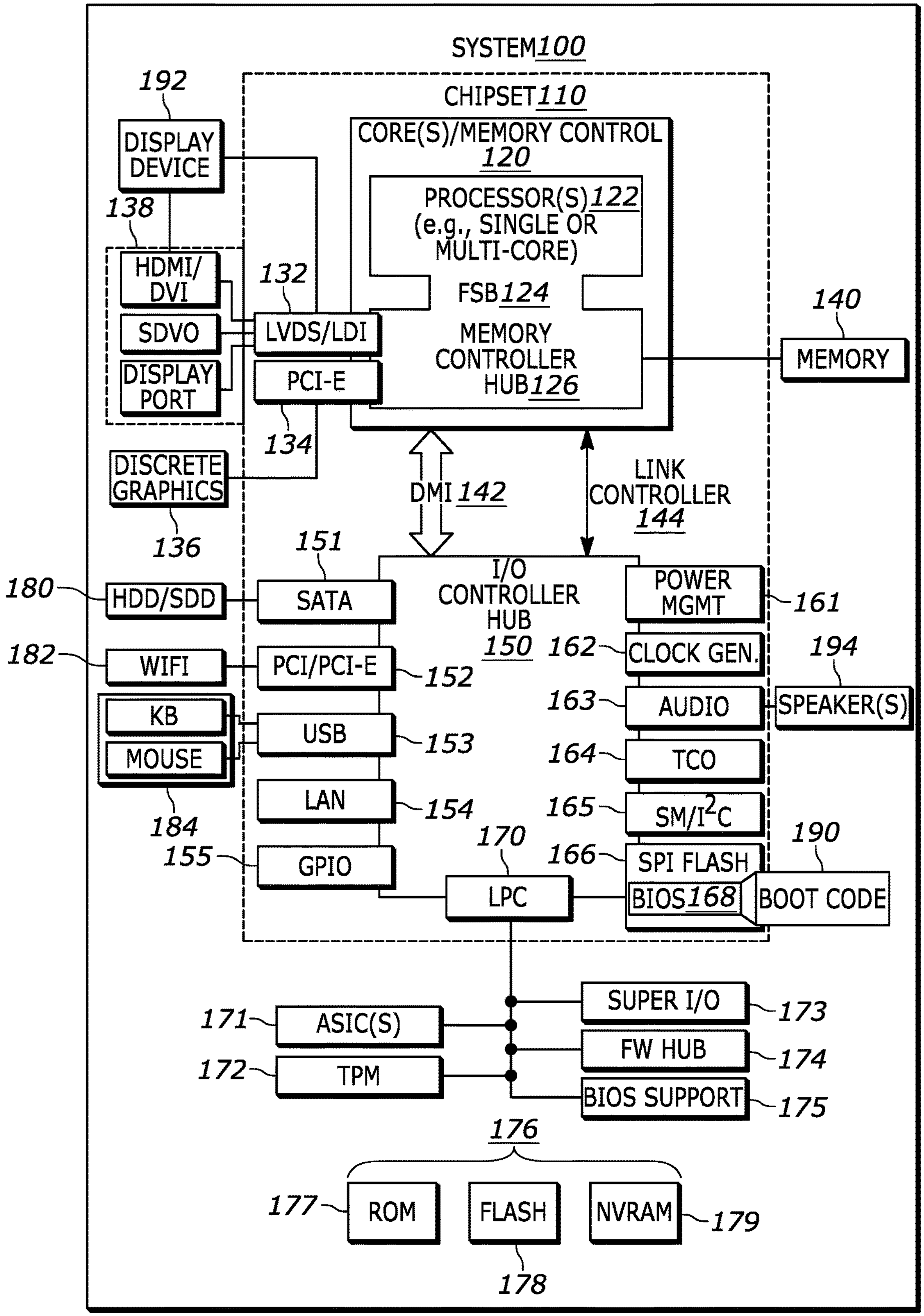
FIG. 1 is a block diagram of an example system in accordance with present principles.

The present application sets forth the use of a device's Wi-Fi and other network connection history as a fingerprint to authenticate if a specific device is trusted or not. Thus, ordering and timing of the different connections may be used to determine whether to permit a future connection or authentication. Furthermore, the history can evolve with time and, in some examples, only the most recent connection history may result in authentication.

Prior to delving into the details of the instant techniques, note with respect to any of the computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a Wi-Fi network, a virtual private network, a WAN or LAN, a wired ethernet network specifically, and/or for communication via Bluetooth communication, via near-field communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
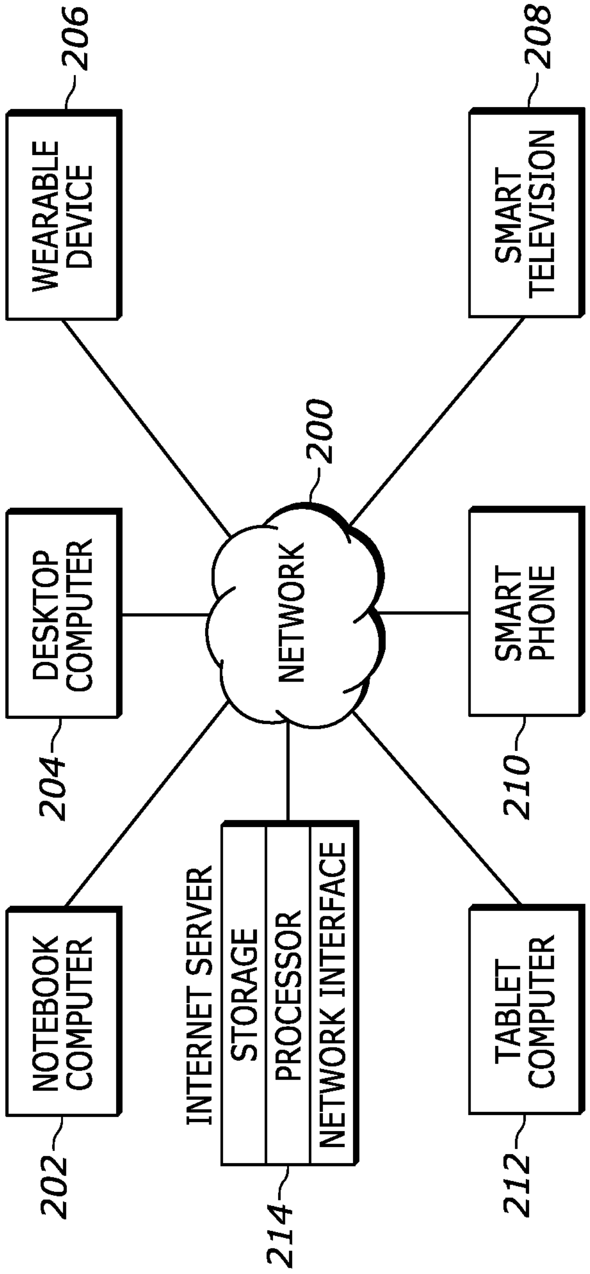
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
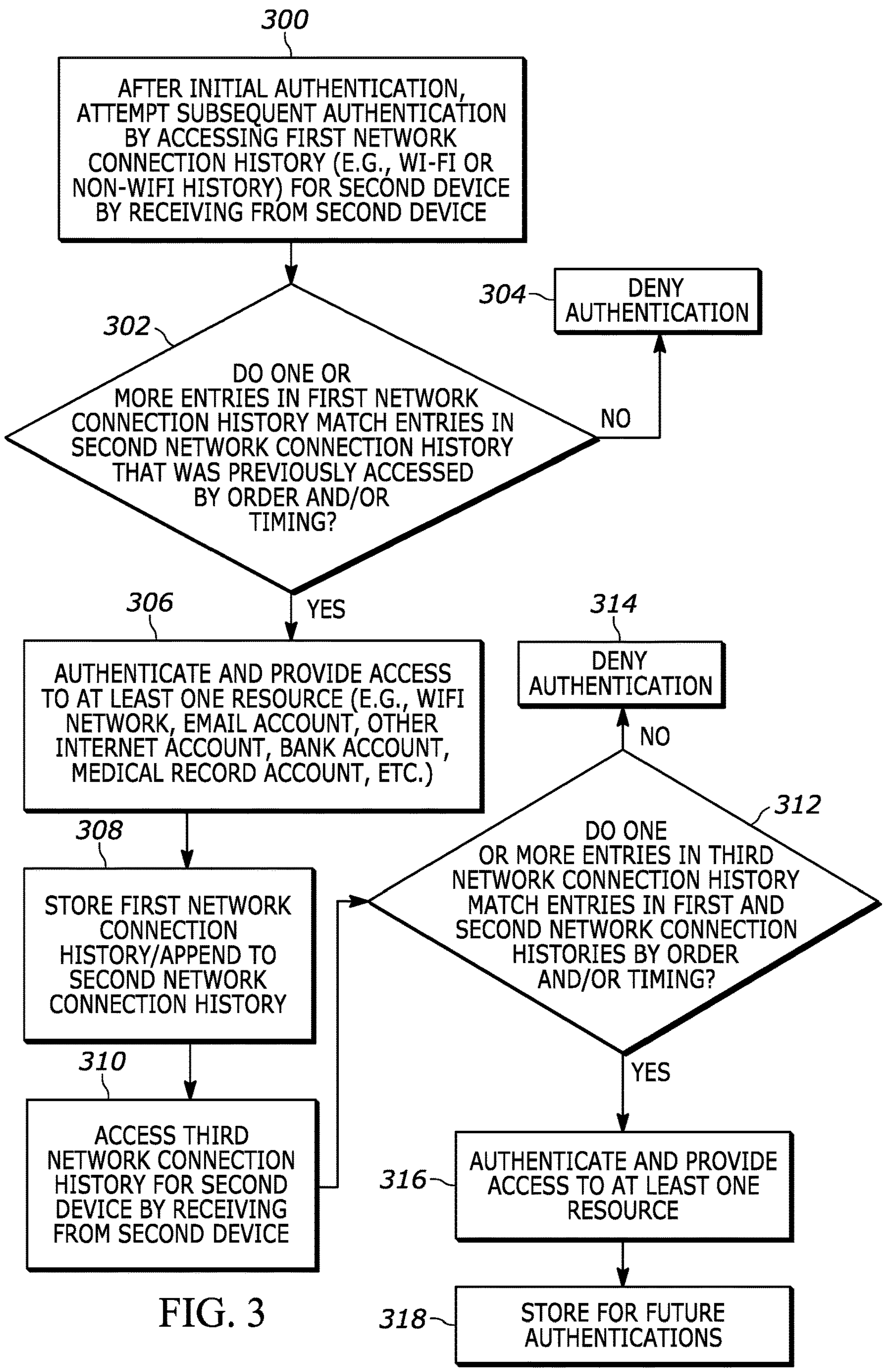
FIG. 3 is a flow chart of an example algorithm to perform authentication using network connection histories in accordance with present principles.

Referring to FIG. 3, it shows example logic that may be executed by a first device such as the system 100 in accordance with present principles for determining whether to authenticate a second device based on network connection history. The first device may be, for example, a server or other computer having resources (e.g., an email account or other user account, or electronic files) that the second device is seeking to access.

Beginning at block 300, the first device may, after an initial or prior authentication using other methods such as username and password authentication, attempt a subsequent authentication in a first instance at least in part using the second device's network connection history. The first device may do so by accessing a first network connection history for the second device, such as a Wi-Fi and/or non-Wi-Fi connection history, by receiving it from the second device or accessing it at a storage location accessible to the first device such as a cloud storage location.

The logic of FIG. 3 may then move to decision diamond 302 where the first device may determine whether one or more entries in the first connection history match respective entries in a second connection history. The second connection history may be a history that was previously accessed based on a prior receipt of the second connection history from the second device or a previous access at the cloud storage location. For example, the second connection history may have been provided by the second device based on successful authentication using other methods of authentication that do not involve use of any network connection history during the initial authentication referenced in the paragraph above.

In some examples, at diamond 302 the first device may determine matches based on an order of plural respective entries indicated in the first connection history matching an order of plural respective entries indicated in the second connection history, and/or based on the timing of respective connections indicated in the first connection history matching the timing of connections indicate in the second connection history. The timing of connections may relate to, for instance, a connection time to a particular network on a particular day, a disconnection time to a particular network on a particular day, or a time range or duration of connection to a particular network on a particular day.

Responsive to a negative determination at diamond 302, the logic may proceed to block 304 where the first device may deny authentication and even take another action like locking the account for which authentication was attempted and/or notifying a system administrator of the unsuccessful attempt. However, responsive to an affirmative determination at diamond 302, the logic may instead proceed to block 306. At block 306 the first device may authenticate the second device (and/or log the device in to a user account) and provide access to at least one resource, which again may be a user account, computer file, or even a bank account or medical record account.

From block 306 the first device may then proceed to block 308 where the first device may store, locally and/or at a secure storage location remote from the first device, the first network connection history. Additionally or alternatively, at block 308 the first device may append new entries from the first network connection history to old entries in a previously-stored version of the network connection history that was accessed at a prior time (referred to below as the second network connection history) so that only additional entries not noted in both the first and second network connection histories are appended to the previously-stored version.

From block 308 the logic may then proceed to block 310 where, in a second instance that occurs at a later time than the first instance, the first device may access a third network connection history for the second device, such as by receiving it from the second device or accessing it at a storage location accessible to the first device such as a cloud storage location.

The logic of FIG. 3 may then proceed to decision diamond 312. At diamond 312, the first device may determine whether one or more entries in the third connection history match respective entries in the first connection history that were not indicated in the second connection history. In some examples, at diamond 312 the first device may further determine whether one or more entries in the third connection history match respective entries common to both the first and second connection histories, either as indicated in the first connection history alone or as determined to be indicated in both the first and second connection histories. As with the determination at diamond 302, at diamond 312 the entry matches may be for commonality as to the order of the entries and/or the timing of the entries.

Responsive to a negative determination at diamond 312, the logic may proceed to block 314 where the first device may deny authentication and even take another action as set forth above. However, responsive to an affirmative determination at diamond 312, the logic may instead proceed to block 316. At block 316 the first device may authenticate the second device (and/or log the device in to a user account) and provide access to at least one resource.

In this way, it may be appreciated that the authentication of block 316 may be even more secure than the authentication of block 306 owing to more network connection entries having to be matched (in addition to possibly matching older entries as well). Thus, should a hacker somehow access the second network connection history before or after the authentication performed at block 306, this alone will be insufficient for successful authentication at block 316 since the first device now also has a copy of the first network connection history from later in time and uses the new connections it indicates (relative to what is indicated in the second network connection history) for authentication, as well as possibly matching entries that are common to both the first and second network connection histories. In this way, as additional authentications are permitted for the second device, subsequent authentications of the second device will be increasingly more secure than prior authentications of the second device.

Still in reference to FIG. 3, from block 316 the first device may then proceed to block 318 where the first device may store, locally and/or at a secure storage location remote from the first device, the third network connection history (or append to a previous history, in some examples). This process may then be repeated in that additional network connection histories may be received by the first device and matched to new entries from an immediately priorly received network connection history also for the second device, as well as possibly also matching old entries indicated in one or more other prior network connection histories other than the immediately prior one that was received by the first device.

Figure 4:
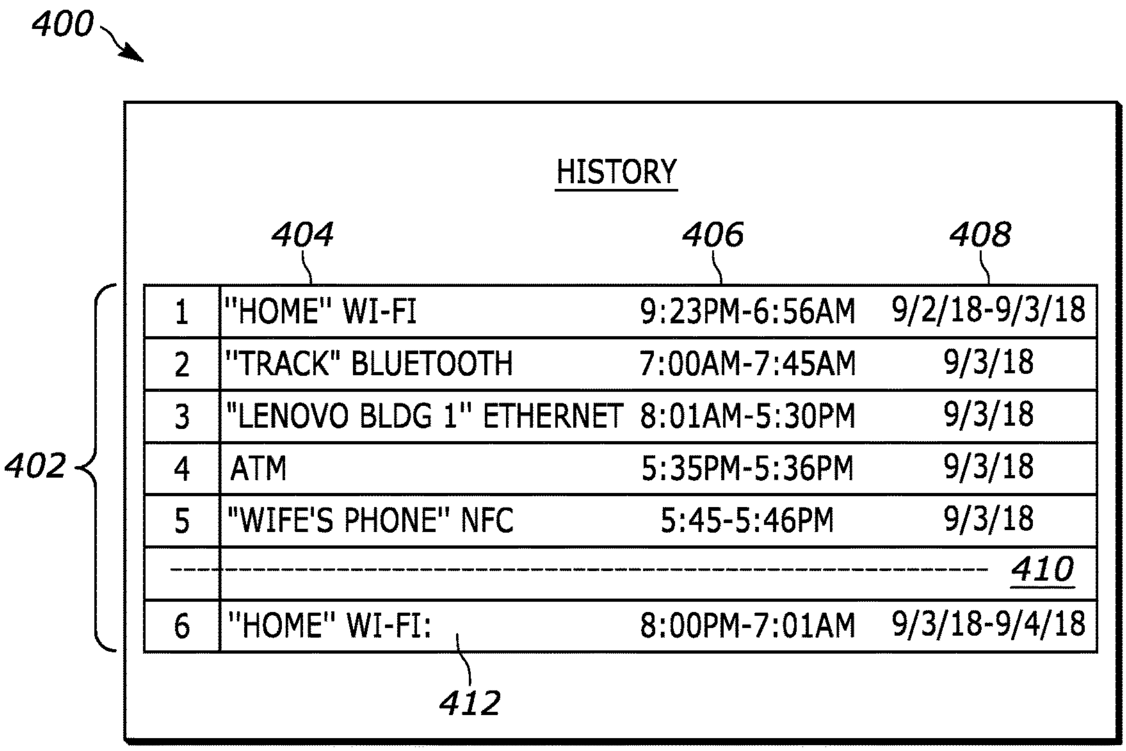
FIG. 4 shows an example network connection history in accordance with present principles.

Reference is now made to FIG. 4, which shows an example network connection history 400 consistent with present principles. As shown, the history 400 may include plural entries 402 ordered in numerical order (though other formats may also be used). As also shown, each entry 402 may indicate a network name 404 (and/or other network identifier) as well as a connection duration/time range 406 defined by beginning and end times for the respective network connection. Each entry may also indicate a date or date range 408 during which the respective network connection occurred.

As may be appreciated from FIG. 4, network connections may pertain to both connections to Wi-Fi networks and connections to other non-Wi-Fi networks, such as Bluetooth networks, ethernet networks, connection between a user device and an automated teller machine (ATM), and connection between two user devices via near-field communication (NFC). Another example is connection to another device via a virtual private network (VPN). In this regard, a network connection may be a connection for communication between only two devices such as a smart phone and vehicle via Bluetooth, or a connection for communication with more than two devices such as might occur when connecting to a Wi-Fi network to browse Internet websites.

FIG. 4 also shows a dashed line 410 for the reader's understanding to illustrate that additional entries such as entry 412 may be appended to a previous version of the network connection history 400 as additional network connections are made. Thus, the appending may be performed by the device to which the network connection history 400 pertains as stored locally at that device, but note that this type of appending may also be performed by the device undertaking the logic of FIG. 3 consistent with present principles to append new entries to a previously-stored network connection history for another device.

Figure 5:
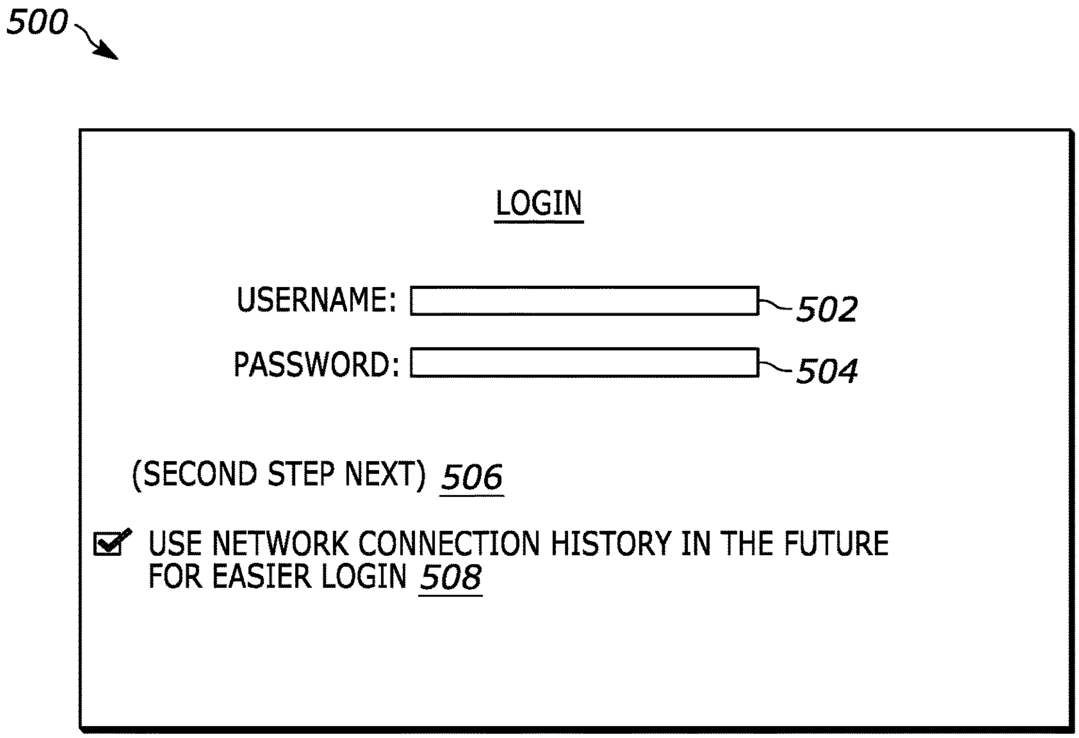
FIG. 5 shows an example graphical user interface (GUI) for performing an initial authentication of a device in accordance with present principles.

Continuing the detailed description in reference to FIG. 5, it shows an example graphical user interface (GUI) 500 presented on the display of a user's device, such as the second device described above in reference to FIG. 3. The GUI 500 may be presented through a web page or application stored locally at the user's device and communicating over the Internet. In any case, the GUI 500 may be for performing an initial authentication using other methods that do not involve use of a network connection history, such as username and password authentication as described in reference to block 300 above.

As shown, a username input box 502 may be presented along with a password input box 504 for a user to respectively input a username and password. An indication 506 may also be presented that a second step in authentication will ensue, assuming the username and password respectively entered into boxes 502 and 504 are valid for authentication. This might be the case if the authentication being attempted requires two-step authentication where multiple levels of authentication are required. For example, the second step may involve receiving a message with a code in it at an email address (via email) or telephone number (via text message), where the email address or telephone number are already known to the authentication system and the user must then enter the code at the second step after the GUI 500 is removed from the display and a subsequent GUI is presented for entrance of the code.

As also shown in FIG. 5, the GUI 500 may also provide the user with an option 508 that is selectable by directing touch or cursor input to the adjacent check box for the user to provide a command that the user authorizes the system to use the user's device's network connection history for subsequent authentications. This may be done so that two-step authentication may not be required for future authentications. For example, network connection history alone may be used for future authentications rather than username/password and/or code validation as provided to an email address or telephone number. However, in other examples this may be done so that two-step authentication is still performed but the second step becomes "invisible" to the user in that the user may still be required to enter a username and password to boxes 502, 504 respectively but is not required to enter a code at a second step and instead the system may authenticate the user's device using its network connection history (without requiring additional user action like code entry as set forth above).

Figure 6:
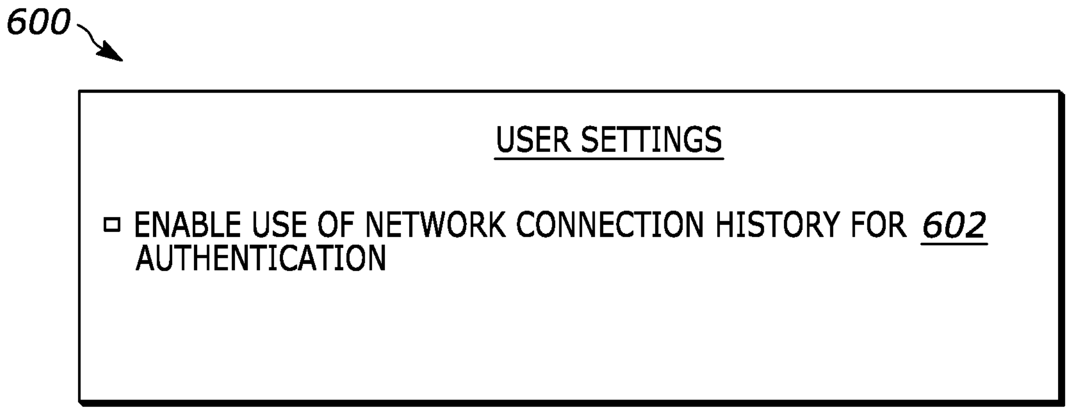
FIGS. 6 and 7 show example GUIs for configuring various settings of devices for undertaking present principles.

FIG. 6 shows an example GUI 600 that may be presented on the display of a user's device for configuring one or more settings related to authentication using the device's network connection history. For example, the GUI 600 may include a setting 602 selectable by directing touch or cursor input to the adjacent check box to enable the device to transmit or otherwise make available its network connection history for authentication of the device and/or associated user. Additionally or alternatively, the setting 602 may be selectable to provide a notification or command to another device or system that will perform the authentication of the user's device using its network connection history that the user consents to such authentication, e.g., to thus configure an account for the user that is maintained by the system to perform authentication using the device's network connection history.

Figure 7:
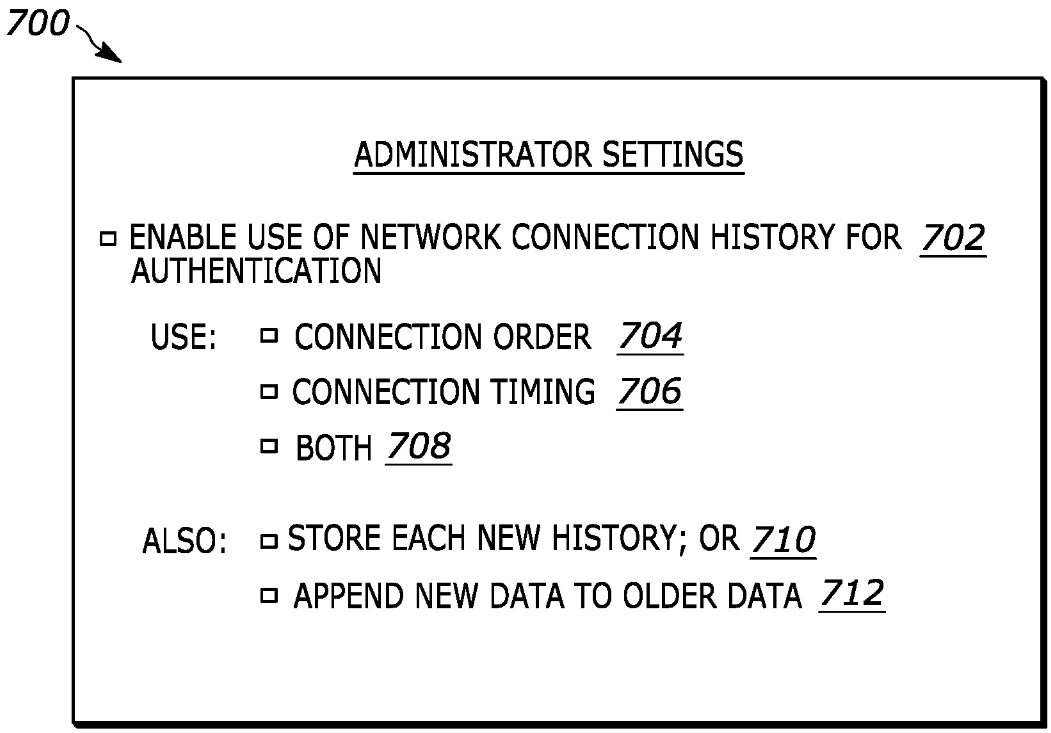

Moving on to FIG. 7, it shows an example GUI 700 that may be presented on the display of a system administrator's device for configuring one or more settings related to authentication of other devices using the other devices' network connection histories. For example, the system administrator and his or her device may be associated with a provider of an account such as an online audio video (AV) content streaming service for which user authentication may be required for users to access the service. Other examples include authentication for a banking account, an email account, a medical records account, a virtual private network (VPN), etc.

Each of the settings or options to be described below in reference to FIG. 7 may be selectable by directing touch or cursor input to the respective check box shown 1201-326 adjacent to the respective setting or option. As shown, the GUI 700 may include a first setting 702 that is selectable to configure the system to perform authentication of user devices using the respective user devices' network connection histories in accordance with present principles. For instance, the GUI 700 may be selected to enable the system administrator's device or another device of the system (e.g., a server) to undertake the logic set forth above with respect to FIG. 3.

The GUI 700 may also include an option 704 to configure the system to use the order of connections as listed in a network connection history for history matching consistent with present principles, as well as an option 706 to configure the system to use the timing of connections as listed in a network connection history for history matching consistent with present principles. The GUI 700 may also include an option 708 to configure the system to use both the order of connections and the timing of connections as listed in a network connection history for history matching consistent with present principles.

Additionally, in some examples the GUI 700 may include an option 710 to configure the system to store each new or additional network connection history that is received by a respective user device as disclosed herein. An option 712 may also be included on the GUI 700 to, in the alternative, append new data from a newer network connection history for a respective user device to an older history for the respective user device consistent with present principles.

It may now be appreciated that present principles provide for an improved computer-based user interface that improves the functionality, electronic security, and ease of use of authentication using the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:

at least one processor; and storage accessible to the at least one processor and comprising instructions executable by the at least one processor to:

access a first network connection history for a second device different from the first device;

determine in a first instance whether to authenticate the second device based on data in the first network connection history matching data in a second network connection history for the second device, the second network connection history being previously stored at a storage location accessible to the first device;

based on a determination in the first instance to authenticate the second device, authenticate the second device;

store the first network connection history;

access a third network connection history for the second device; and determine in a second instance whether to authenticate the second device based on data in the third network connection history matching data in the stored first network connection history, the matched data in the stored first network connection history not being indicated in the second network connection history.

2. The first device of claim 1, wherein the first network connection history comprises a non-Wi-Fi network connection history for plural different non-Wi-Fi networks to which the second device has connected in the past.

3. The first device of claim 1, wherein the first network connection history comprises a non-Wi-Fi network connection history, and wherein the non-Wi-Fi network connection history comprises one or more of: a Bluetooth connection history, an automatic teller machine (ATM) connection history, a near-field communication (NFC) connection history.

4. The first device of claim 1, wherein the matching in the first instance comprises plural network connections indicated in the first network connection history matching network connections indicated in the second network connection history by order of connection.

5. The first device of claim 1, wherein the matching in the first instance comprises plural network connections indicated in the first network connection history matching network connections indicated in the second network connection history by timing of connection.

6. The first device of claim 1, wherein the matching in the first instance comprises plural network connections indicated in the first network connection history matching network connections indicated in the second network connection history by both order of connection and timing of connection.

7. The first device of claim 1, wherein the instructions are executable to:

determine in the second instance whether to authenticate the second device: based on data in the third network connection history matching data in the stored first network connection history that was not indicated in the second network connection history, and based on data in the third network connection history matching data in the second network connection history.

8. The first device of claim 1, wherein the instructions are executable to:

prior to the first and second instances, present a graphical user interface (GUI) on a display and authenticate the second device based on user input to the GUI, the GUI comprising an option that is selectable by a user to authorize use of the second device's network connection history for one or more subsequent authentications of the second device.

9. The first device of claim 8, comprising the display.

10. The first device of claim 1, wherein the data in the first network connection history that is matched to the data in the second network connection history in the first instance comprises data for network connections to plural different networks of different network types.

11. A method, comprising:

accessing, at a first device, a first network connection history for a second device different from the first device;

determining in a first instance whether to authenticate the second device based on data in the first network connection history matching data in a second network connection history that was previously stored at a storage location accessible to the first device;

responsive to determining in the first instance to authenticate the second device based on the first network connection history, authenticating the second device and permitting access to at least one resource;

accessing a third network connection history for the second device;

determining in a second instance whether to authenticate the second device based on data in the third network connection history matching data in the first network connection history, the data matched in the second instance not being indicated in the second network connection history; and responsive to determining in the second instance to authenticate the second device, authenticating the second device and permitting access to the at least one resource.

12. The method of claim 11, wherein the at least one resource comprises one or more of: an email account, a bank account, an account indicating medical records.

13. The method of claim 11, comprising:

prior to the first and second instances, presenting a graphical user interface (GUI) on a display and authenticating the second device based on user input to the GUI, the GUI comprising an option that is selectable by a user to authorize use of the second device's network connection history for one or more subsequent authentications of the second device.

14. The method of claim 11, wherein permitting access to the at least one resource comprises permitting access to a content streaming service.

15. A computer readable storage medium (CRSM) that is not a transitory signal, the computer readable storage medium comprising instructions executable by at least one processor to:

access, via a first device, a first network connection history associated with a second device different from the first device;

determine in a first instance whether to authenticate the second device based on data in the first network connection history matching data in a second network connection history for the second device, the second network connection history being previously stored at a storage location accessible to the first device;

responsive to determining in the first instance to authenticate the second device based on the first network connection history, authenticate the second device and permit access to at least one resource;

access a third network connection history for the second device;

determine in a second instance whether to authenticate the second device based on data in the third network connection history matching data in the first network connection history, the data matched in the second instance not being indicated in the second network connection history; and responsive to determining in the second instance to authenticate the second device, authenticate the second device and permit access to the at least one resource.

16. The CRSM of claim 15, wherein the instructions are executable to:

determine in the first instance whether to authenticate the second device based on a first network disconnection time indicated in the first network connection history matching a second network disconnection time indicated in the second network connection history.

17. The CRSM of claim 15, wherein the instructions are executable to:

determine in the first instance whether to authenticate the second device based on a first network connection time range for a network connection as indicated in the first network connection history matching a second network connection time range for the network connection as indicated in the second network connection history.

18. The CRSM of claim 15, wherein the instructions are executable to:

present a graphical user interface (GUI) on a display, the GUI comprising an option that is selectable by a user to authorize the first device to use one or more network connection histories of the second device for one or more future authentications of the second device.

19. The CRSM of claim 18, wherein the instructions are executable to:

present the GUI on the display and, prior to the first instance, authenticate the second device based on user input to the GUI.

20. The CRSM of claim 18, comprising the display.

* * * * *